Feb. 13, 1934.  R. RUDENBERG  1,947,061
ALTERNATING CURRENT LONG DISTANCE LINE
Original Filed Jan. 31, 1929
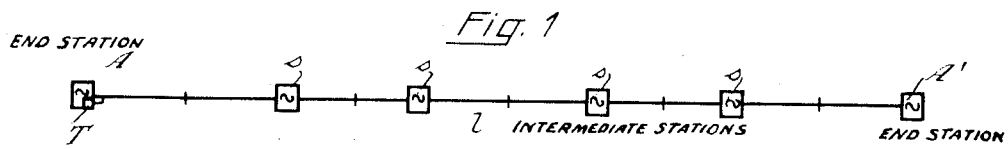
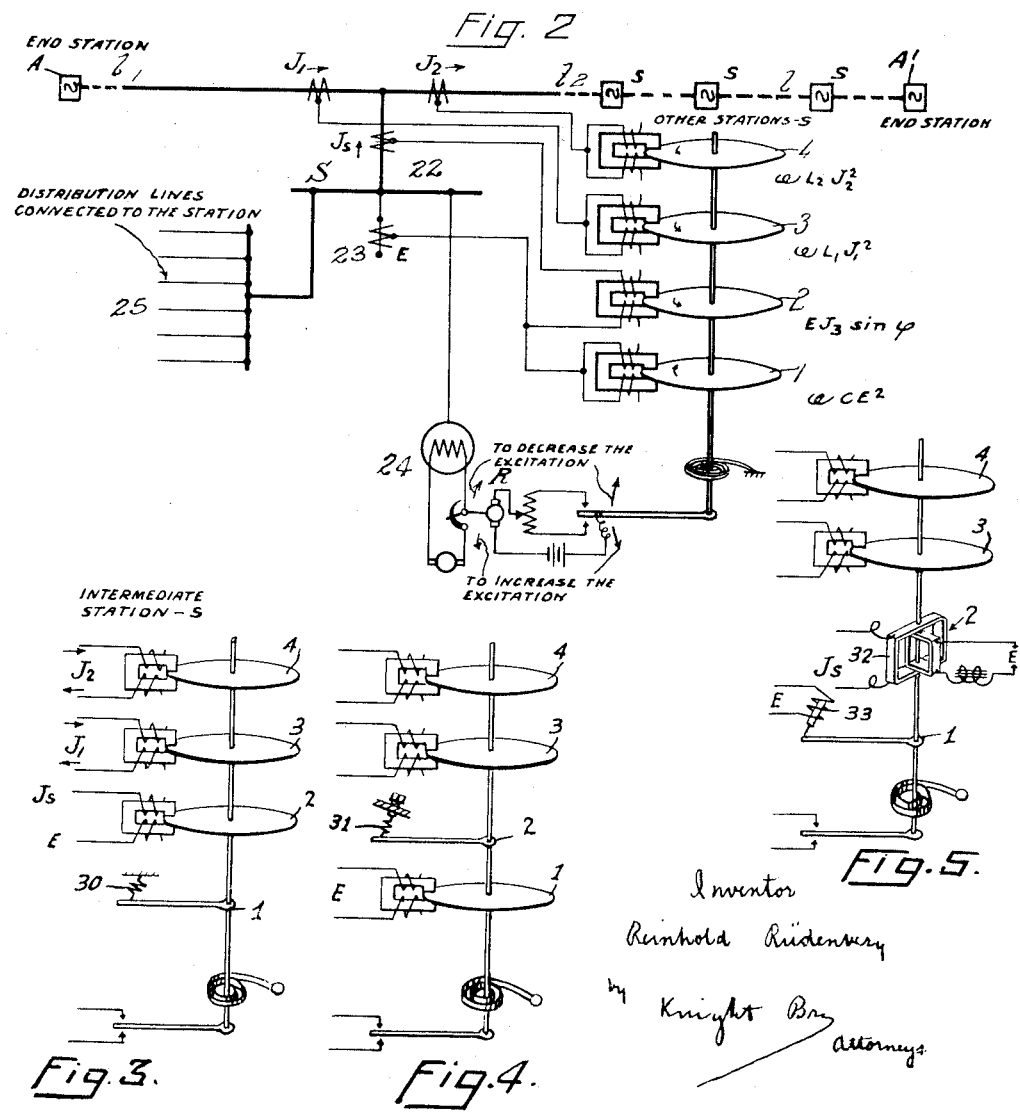

Patented Feb. 13, 1934

1,947,061

UNITED STATES PATENT OFFICE 1,947,061

ALTERNATING CURRENT LONG DISTANCE LINE

Reinhold Rudenberg, Berlin - Grunewald, Germany, assignor, by mesne assignments, to Westinghouse Electric and Manufacturing Company, a corporation of Pennsylvania Application January 31, 1929, Serial No. 336,405, and in Germany December 5, 1928. Renewed August 10, 1933

6 Claims. (Cl. 172—246)

My invention relates to improvements in alternating current long distance lines.

In alternating current long distance transmission lines carrying variable current it is generally desirable to maintain the voltage constant to enable direct connection to be made at the generator and consumer end as well as at any number of intermediate stations to the customary distribution networks. The high self-induction of such lines causes, however, considerable inductive voltage drops and the great capacity of such high-tension overhead lines or cables causes the development of strong charging currents, which in their turn bring about line-drops. It is therefore necessary to regulate in such lines the detrimental wattless or reactive currents and reactive voltages by means of additional apparatus, which by the introduction of external wattless currents or voltages compensate the detrimental effects and thus maintain a normal voltage on the line. There are already known a number of such compensating means. It is possible for instance to connect the external wattless current generators in parallel as well as in series to the line. The wattless current generators may be synchronous machines, asynchronous machines, choke coils, condensers and the like, which may be connected in various manners and operated in various ways.

The object of my invention is to provide a simple and exact method by means of which these wattless current generators for compensating the line-drop in the line may be regulated, and to suggest suitable regulating mechanisms for said means.

In the drawing affixed hereto

Fig. 1 illustrates diagrammatically a long distance transmission line or a section thereof, and Fig. 2, a section of the line with a station at which the compensating wattless power is supplied in parallel, and Figs. 3, 4 and 5 are diagrammatic views of the relay, showing modifications or variations from the structure shown in Fig. 2.

Referring to Fig. 1 of the drawing, it will be seen that the entire line 1 may have two end stations A, and A' but it will be understood that it may equally well be connected to other lines to form a ring or network. At all the intermediate stations s power is supplied to or withdrawn from the line and in these stations are also housed the line-drop compensators. These compensators at each station should be so dimensioned that they are mainly able to compensate a definite portion of the line, such as one half of each section between the individual stations. At the station A is located the voltage regulator T which maintains the voltage at that station constant.

It is well known that in a long alternating current line the conditions should preferably be such, that the ratio of voltage and current is equal to the resulting characteristic impedance of the line, which equals the square root of the ratio of the effective line self inductance per unit length to the effective line capacity per unit length. Herein the effective line self inductance is composed of the line inductance proper and the inductance or the capacity of the series-connected compensating devices taken together. The effective line capacity is composed of the line capacity proper and the capacity or inductivity of the parallel-connected compensating devices, taken together. In such a case wattless energies, delivered by the line to consumers connected to it, have the effect on the line of parallel-connected compensating devices.

We have, accordingly, for the characteristic impedance the equation $$\frac{E}{J}=\sqrt{\frac{L}{K}} \qquad (1)$$

In this equation E represents the line voltage, J the line current, L the effective line inductance in henries, and K the effective line capacity in farads.

By assuming $\omega$ equal to $2\pi$ times the alternating current frequency this condition may also be written:

$$\omega K E^2 = \omega L J^2 \qquad (2)$$

and indicates, that the total wattless power dependent on the voltage and the total wattless power dependent on the current should be equal to each other. In pure series connection of the compensating means their wattless power is generally dependent on the current and affects the right-hand side of the Equation (2).

In pure parallel connection of the compensating wattless current means, their wattless output is generally dependent on the voltage and affects the left-hand side of the Equation (2). In any case the wattless power of the external compensating means of the line must be included in the power balance sheet of the Equation (2), if it is desired to have a complete compensation of the wattless power in each section of the line and thus also on the entire line. The wattless components of the apparent outputs of any connected networks or current consumers withdrawn or supplied at the stations are to be included in this power balance sheet of the wattless output.

According to my invention the additional wattless power generators in the individual stations, which should serve for the compensation, are to be regulated in such a way, that the condition of the Equation (2) is fulfilled at all times, and an indicator is to be employed for the purpose, which indicates the balance of the wattless powers according to Equation (2) and in the case of unbalance causes the increase or decrease of the wattless output of the additional wattless power generators, The conditions will be more fully explained with reference to an example of a parallel supply of the compensating wattless power at a station. Referring to Fig. 2 of the drawing 1 is the overhead transmission line, S the busbar of a station to which is connected a network 25 of any kind, which is able to supply or consume active or inphase currents, or reactive or wattless currents as desired. A compensating device 24 is here shown as a synchronous machine, with a regulator R for its exciting current. If the Equation (2) is written in the form.

$$J_K E = \omega L J^2 \quad (3)$$

$J_K$ would represent the total wattless current supplied to the line section, which consists of the charging current $J_C$ of the line as well as of the magnetizing wattless current component $J_S \sin \phi$ of the station. The left-hand side of the Equation (3) may therefore be written $$J_K E = J_C E - J_S \sin \phi \quad E = \omega C E^2 - E J_S \sin \phi \quad (4)$$

in which C represents the capacities of the two line sections. The loading current of the line itself is here again expressed by the natural capacity of the line. The right-hand side of the Equation (2) consists of two values, viz. the wattless powers of the left-hand and the right-hand branch or line-sections $l_1$ and $l_2$, respectively, which are apportioned to the station for compensating purposes, and which must be treated separately, because they may carry currents of different values. It is therefore $$\omega L J^2 = \omega L_1 J_1^2 + \omega L_2 J_2^2 \quad (5)$$

The balance of the wattless power in the line sections of this station is obtained by the substitution of Equations (4) and (5) in Equation (3):

$$\omega C E^2 - E J_S \sin \phi - \omega L_1 J_1^2 - \omega L_2 J_2^2 = O \quad (6)$$

To construct an indicator corresponding with this condition of balance according to my invention, a relay may for instance be used, on the movable part of which act mechanical forces, which are proportional to the individual members of this equation. In Fig. 2 of the drawing four Ferraris discs or wattmeter elements 1 to 4 are mounted for this purpose on a common shaft and are controlled by four stationary double-coil field magnet-systems which receive their currents from the auxiliary transformers 10, 20, 22, 23. In the lowest unit 1 both coils are controlled by the line voltage E at the station, so that the unit develops a torque corresponding with $E^2$. By suitable choice of the currents and torques in the initial design of the apparatus, or sometimes by using suitable adjusting means for varying these quantities in actual service, the proportionality factor of this torque should be properly adjusted, according to the capacity C of the two line branches to be compensated by the station. This unit thus measures the capacity output or charging volt-amperes of the line i. e., the capacitative wattless energy of the two branches which is equal to $\omega C E^2$. In the second Ferraris unit 2, the same voltage E acts on one coil, and on the other the total current $J_S$ of the station, so that the torque becomes proportional to $E \cdot J_S \cdot \sin \phi$. This unit thus measures the wattless output of the station. The third Ferraris unit 3 has both of its field coils controlled by the current $J_1$ of the left-hand line branch, with its proportionality factor adjusted according to the self-induction $L_1$ of the left-hand portion of the line. The fourth Ferraris unit 4 is similarly controlled by the current $J_2$ of the right-hand line branch and is adjusted according to the self-induction $L_2$ of the latter.

Since the torques of the four discs are in equilibrium only in case of perfect compensation according to equation (6), and at other times have a tendency to turn towards the right or towards the left, they might be used directly for the adjustment of the exciter regulator R. Preferably this aggroupment of wattmeter elements is allowed to close either one of two contacts, which govern the clockwise or counter-clockwise rotation of a special auxiliary motor, as shown in Fig. 2, thus adjusting the regulator R and causing the compensating machine 24 to supply more or less wattless current. A spring supported contact in the relay as shown serves to maintain the device in the position of rest in the state of equilibrium.

This arrangement brings about in the shortest time a perfect regulation and restitution of the compensation and thus of the most favorable voltage distribution for any changed conditions of the total plant. If, for instance, the output traversing the long line increases, the currents $J_1$ and $J_2$ change with it and develop an increased inductive voltage drop. The relay responds instantly, renders the regulator operative and decreases the demagnetizing wattless output of the synchronous machine 24 until the total wattless current $J_S \sin \phi$ of the station has been diminished to such an extent, that its inductive drop in the line has been reduced by the same value as called for by the increasing voltage drop of the transmitted output. In other words, an increase in the currents $J_1$ and $J_2$ in the line-sections $l_1$ and $l_2$ connected to the station causes an increase in the excitation of the synchronous machine 24. If on the other hand the useful load of the network 25 connected to the station changes, the active current fluctuations are taken up by the long line and $J_1$ and $J_2$ are changed thereby with the same result as described above. The changes of the wattless current of the entire station thus act upon the relay and cause such a change at the regulator, that the total wattless current of the station returns to the correct value. If the voltage of the long line or the station changes, so that the capacity current of the line changes, this influence makes itself also felt in the relay and is at once compensated by the operation of the wattless current regulator R. Thus a decrease in the line voltage E causes an increase in the excitation of the synchronous machine 24. It is possible with this regulating system to work properly at any desired voltage on the long line and the compensation conditions are always exactly adhered to. The directions of the torques of the various wattmeter elements 1 to 4 are indicated in Fig. 2, assuming $J_S \sin \phi$ to correspond to a demagnetizing wattless current in the synchronous machine.

It is possible to regulate the operating voltage of the line from a different station than station A in Fig. 1. It may be fixed, for instance, by a voltage regulator located at any station connected to the long line. If this independence of the voltage is not desired, it is only necessary to replace the lowest Ferraris unit 1 of the relay with a constant-torque device such as a weight or spring 30, as shown in Fig. 3, thereby obtaining a regulation for constant voltage the value of which may be adjusted as desired by changing the weight or the strength of the spring or other constant-torque device. In the same way it would be possible to replace the second Ferraris unit 2 with an adjustable-force device 31, as shown in Fig. 4, to give a regulation which maintains a certain constant wattless current at the station, but this is not as frequently desired, from an operating standpoint.

Instead of the Ferraris relay any other relays or measuring devices might naturally be used, which are capable of supplying torques according to the condition Equation (6), such as a rotary-coil unit 32 (Fig. 5) which responds to E. J. sin $\phi$, or a moving iron instrument 33 (Fig. 5) which responds to $E^2$, or similar mechanisms well known per se.

For my invention it is only essential that the balance of the wattless outputs in the plant according to Equation (6) shall be so reproduced, in an indicator, that the regulating device for the wattless output at the stations shall respond to the unbalance and shall introduce corrective measures which will produce a balanced relay condition again. It will be understood that it is quite immaterial, insofar as the broader aspects of my invention are concerned, what type of compensating means are located at the stations, and whether the compensator consists of a synchronous machine, as in Fig. 2 of the drawing, or of any other of the compensating means mentioned heretofore.

It is also immaterial how the individual currents and voltages for the indicator are derived from the lines, whether they are generated by current and voltage transformers, by resistances, by auxiliary capacities or self-inductions, or whether individual currents are split up or a plurality of them are combined. For saving the costs of installing current transformers the current $J_s$ in the station of Fig. 2 may, for instance, be obtained by forming the difference between the currents $J_1$ and $J_2$ of the line.

Exactly in the same way as described with reference to a compensator connected parallel to the line, indicators and regulation methods may, according to my invention, be developed for compensating devices connected in series to the line. It is then only necessary to modify Equation (2) by splitting not the left-hand but the right-hand side into its various constituents. Here also one arrives at a condition of equilibrium, which may be reproduced by equally simple indicators.

The regulating devices of the wattless current at the various stations are so adjusted for the regular operation of the plant corresponding to the general Equation (2) or the more specific Equation (6), that they supervise the wattless outputs of a definite section of the line and balance it. To each station is thus apportioned a definite section of the line. It may, however, happen that an accidental disturbance in one of the stations causes either the regulating equipment, the compensating device or even the entire station to break down. The line section belonging to this station is then, to start with, uncompensated and its wattless currents flow into the other sections. Preferably each of the neighbouring stations should then take over the uncompensated part directly adjacent to its own compensated part. This may be attained by increasing by an adequate amount the proportionality factors of the individual units of the indicator, which correspond with the first member and one of the two last members of the left-hand side of the Equation (6). Since each neighbouring station with its wattless current $J_s \sin \phi$ should now compensate a further line section, the capacity C and the self-induction $L_1$ or $L_2$ belonging to it increase by the measure of the new line section. If the corresponding additions are made to the indicator, for instance in Fig. 2 by varying the sensitiveness of the Ferraris units 1 and 4 or 1 and 3, it reproduces correctly the condition of balance on the new line system with added right-hand side or left-hand side line sections of the cutout stations.

This changing over may generally be attained by changing the resistances or self-inductions or number of turns in the measuring circuit. It is either initiated by hand on receiving the report of the defective station, or it is automatically rendered operative by providing each station with a relay (not shown) which responds either on impermissible voltage increases or on impermissible wattless currents traversing the long line in the station or on both in cooperation. Good service in this direction is, for instance, given by a wattless power relay (not shown), the voltage coil of which is traversed by the voltage E of the line and the current coil by the sum of the currents $J_1$ and $J_2$ in the two line sections. Such a relay responds when the wattless current, previously supplied by a station which has dropped out, now flows into one or both sides of the line and traverses the neighbouring stations.

If two adjacent unequal line sections of the lengths $a_1$ and $a_2$ are secured to a single station, the wattless current $J_s$ of the station divides into two unequal branches towards the right and the left, and it is advisable, therefore, to cause the aforesaid protective relay to respond not only to the sum of the currents $J_1$ and $J_2$, but also to cause these currents to become operative only in the inverse ratio of the square roots of the lengths $a_1$ and $a_2$ of their line sections. If the relay is allowed to respond to $$E\left(\sqrt{\frac{a_2}{a_1}}J_1 + \sqrt{\frac{a_1}{a_2}}J_2\right) \sin \varphi \qquad (7)$$

this expression remains, during the regular operation of all the stations, but rises instantly to an abnormally high value in the neighbouring stations, in case of failure of any one station, which suffices to change said neighbouring stations over to the new balance condition. Since such an output relay simultaneously indicates the direction from which the uncompensated wattless current arrives, it indicates selectively the disturbed balance of the left-hand or the right-hand connected line of each station and may serve to correct in a corresponding manner the first member and either the third member or the fourth member of the indicator according to Fig. 2 or the Equation (6).

Exactly as in the intermediate stations the same regulation may be employed in the end stations. For this purpose one line $l_1$ in Fig. 2 may be imagined as omitted and the indicator may be allowed to operate on a compensating device 24, which then compensates only the first line section $l_2$ from the station. The generators of the station may be connected, in this case, to the busbars S, like the other consumer or generator networks in Fig. 2. The place of the line $l_1$ may, however, be taken by the generators of the end station and their undesired wattless current may also be compensated automatically. These generators may also be utilized as the compensating device 24 and their excitation may be automatically regulated from the indicator wattmeter elements either by themselves or in addition to any other regulating method. In such a case the lower voltage element 1 of the indicator 2 is preferably replaced by a constant force, to regulate for a definite voltage of the station besides effecting the compensation.

Various changes and modifications may be made without departing from the spirit of the invention.

What I claim is:—

1. A long distance line connected to a source of alternating current, comprising at least one station having means for compensating the wattless energy in the line, an indicator adapted to control said compensating means and comprising three distinct means severally and independently responsible, respectively, to three segregated values, viz. the inductive wattless output of the currents traversing said long line, the wattless output fed into said line at the place of the compensating means, and an output corresponding with the capacitive wattless power of said long line.

2. A long distance line connected to a source of alternating current, comprising at least one station having means for compensating the wattless energy in the line, an indicator adapted to control said compensating means and operative to segregate, and to respond to the state of balance of, the following wattless outputs; the inductive wattless output of the currents traversing said long line, the capacitive wattless output of the voltage of said long line and the inductive or capacitive wattless output fed into said line at the place of the compensating means.

3. A long distance line connected to a source of alternating current, comprising a plurality of stations having means for compensating the wattless energy in the line, an indicator adapted to control said compensating means and comprising three distinct, mechanically connected means severally an independently responsive, respectively, to three segregated values, viz. the inductive wattless output of the currents traversing said long line, the wattless output fed into said line at the place of the compensating means, and an output corresponding with the capacitive wattless power of said long line, each station having apportioned to it a definite length of the line with its wattless outputs for controlling said indicator.

4. A long distance line connected to a source of alternating current, comprising at least one station having means for compensating the wattless energy in the line, and an indicating instrument composed of a plurality of mechanically coupled wattmetric systems having their windings suitably connected to the line so that each system is responsive to one of the component portions of the total wattless energy represented by the equation $$\omega CE^2 - EJs \sin \phi - \omega L_1 J_1^2 - \omega L_2 J_2^2 = O$$

whereby said instrument indicates the balance of said component portions of the total wattless energy by the torque balance of the several systems.

5. A long distance line connected to a source of alternating current, comprising at least one station having means for compensating the wattless energy in the line, and an indicating instrument composed of a plurality of mechanically coupled wattmetric systems having their windings suitably connected to the line so that each system is responsive to one of the component portions of the total wattless energy represented by the equation $$\omega CE^2 - EJs \sin \phi - \omega L_1 J_1^2 - \omega L_2 J_2^2 = O$$

whereby said instrument indicates the balance of said component portions of the total wattless energy by the torque balance of the several systems, said indicator having a definite zero position when the individual systems balance relatively to one another.

6. A long distance line connected to a source of alternating current, comprising a plurality of stations having means for compensating the wattless energy in the line, an indicator adapted to control said compensating means and operative to segregate, and to respond to the state of balance of, the following wattless outputs; the inductive wattless output of the currents traversing said long line, the capacitive wattless output of the voltage of said long line and the inductive or capacitive wattless output fed into said line at the place of the compensating means, and a voltage regulator in any of said stations connected to said long distance line and adapted to regulate the voltage of said long line to a definite value.

REINHOLD RUDENBERG.